J. B. WILSON.
RESILIENT WHEEL.
APPLICATION FILED JAN. 2, 1917.

1,236,525.

Patented Aug. 14, 1917.
2 SHEETS—SHEET 1.

Inventor
John B. Wilson

By Herbert E. Smith
Attorney

J. B. WILSON.
RESILIENT WHEEL.
APPLICATION FILED JAN. 2, 1917.
1,236,525.
Patented Aug. 14, 1917.
2 SHEETS—SHEET 2.
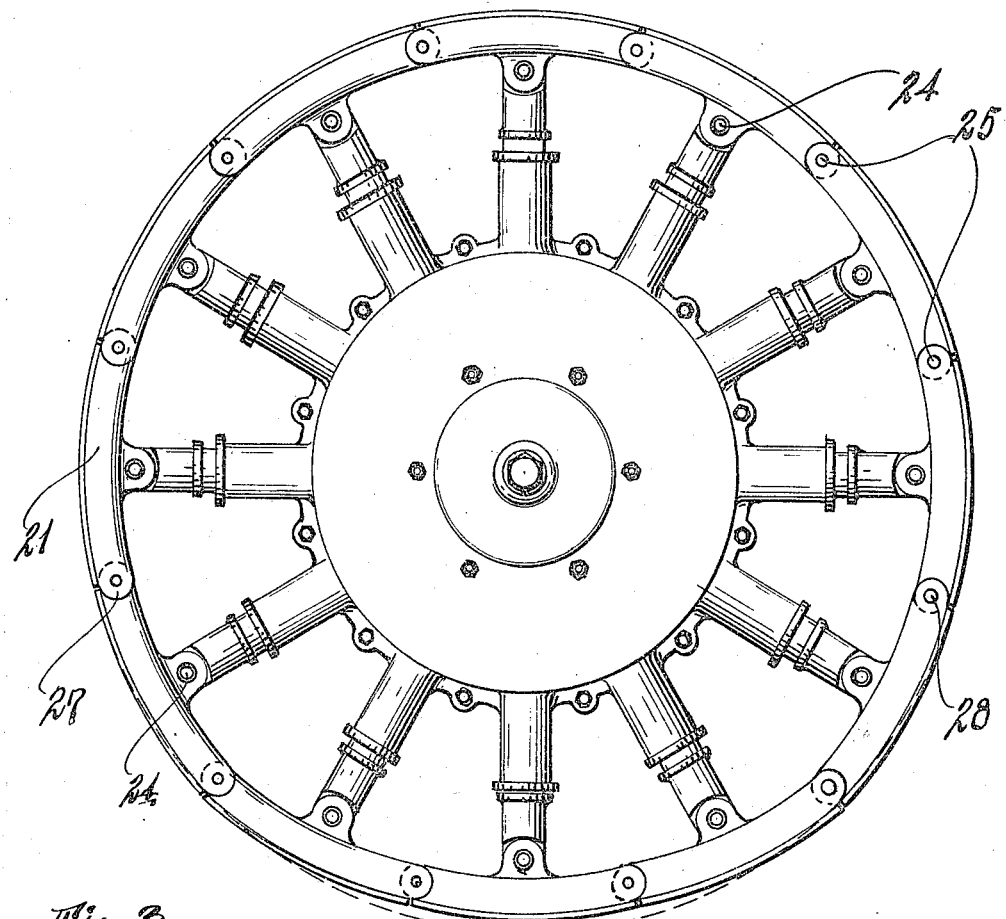
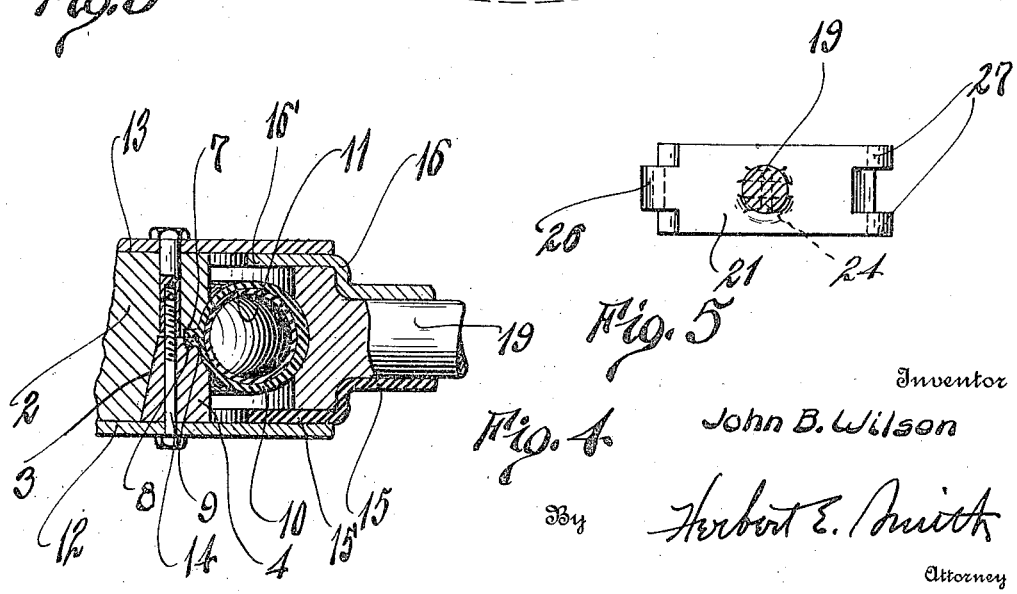
Inventor
John B. Wilson
By Herbert E. Smith
Attorney

UNITED STATES PATENT OFFICE.

JOHN B. WILSON, OF PASCO, WASHINGTON.

RESILIENT WHEEL.

1,236,525. Specification of Letters Patent. Patented Aug. 14, 1917.

Application filed January 2, 1917. Serial No. 140,258.

*To all whom it may concern:*

Be it known that I, JOHN B. WILSON, a citizen of the United States, residing at Pasco, in the county of Franklin, and State of Washington, have invented certain new and useful Improvements in Resilient Wheels, of which the following is a specification.

My invention relates to improvements in resilient wheels, and more particularly to that class of wheels designed to eliminate and take the place of the conventional pneumatic or other tread cushioning means such as are commonly employed for motor vehicles.

The principal object of my invention is the provision of a wheel of the foregoing character of novel construction, which will serve in a most practical and thoroughly efficient manner all the purposes of pneumatic or cushion tires, and, at the same time obviate the disadvantages of wear, punctures and blow-outs which constitute the most serious objections to the tire type of wheel cushioning means.

A further object of my invention resides in providing a very economical cushioning means, and also one which may be employed to equal advantage for either light or heavy types of motor vehicles.

Additional advantages and the features of construction will be hereinafter fully pointed out and described in connection with the accompanying drawings, in which—

Fig. 3 is a side elevation of a somewhat modified construction embodying my invention.

Fig. 4 is an enlarged sectional view through the pneumatic cushioning element, a portion of the hub and one of the spokes.

Fig. 5 is a view of the inner face of one of the rim sections of the modified construction shown in Fig. 3.

Figure 1:
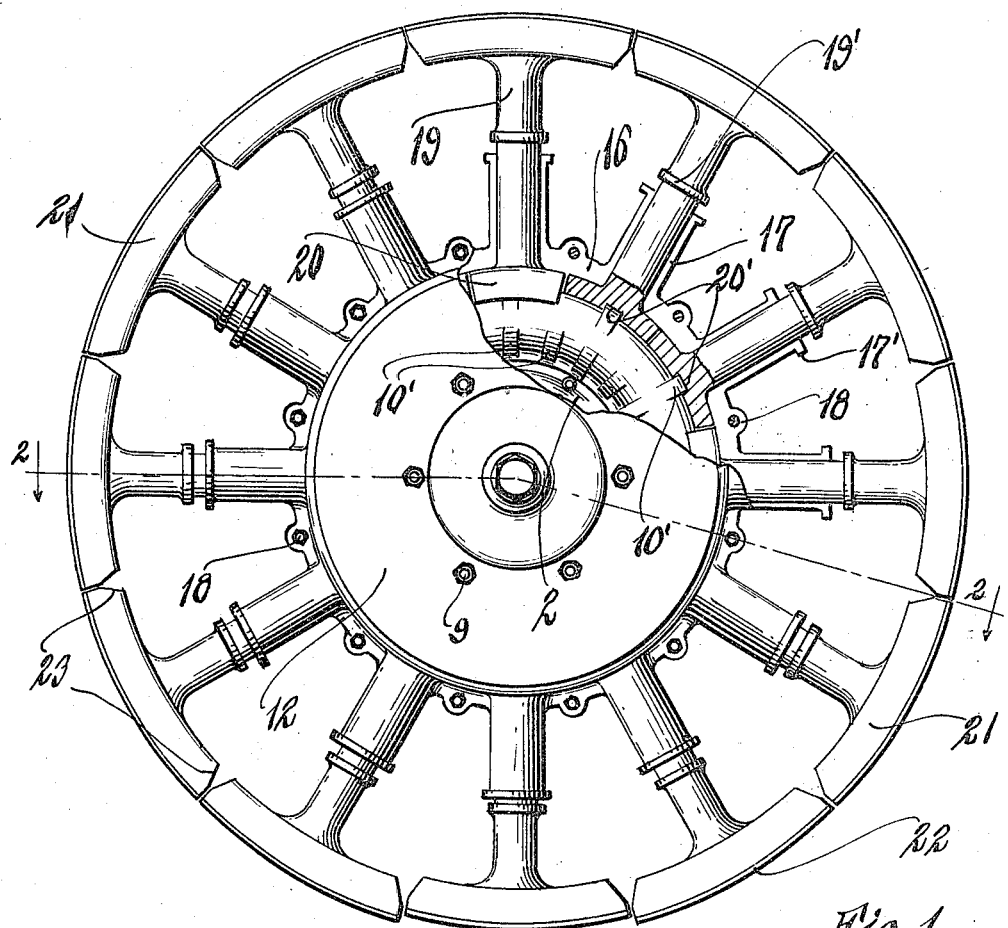
Figure 1 represents a side elevation of the complete wheel with a portion of the hub section broken away to disclose the internal disposition of the cushioning element and other parts.
Figure 2:
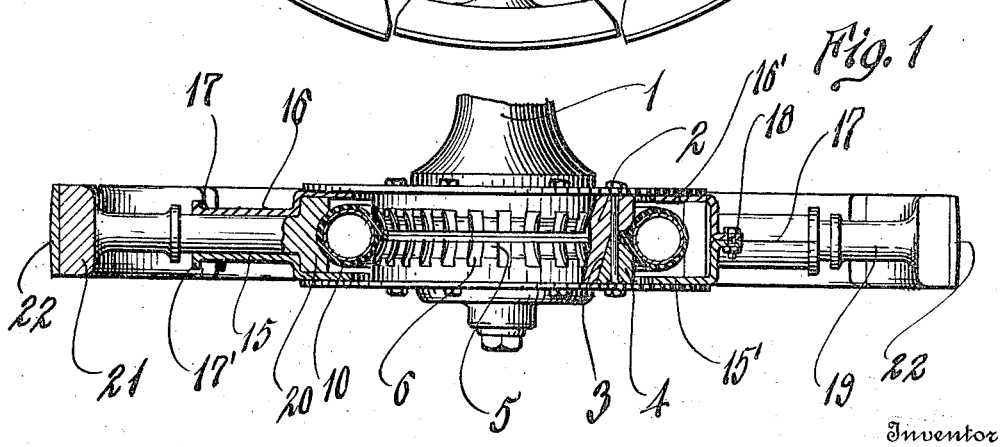
Fig. 2 is a radial sectional view through the wheel taken on line 2—2 of Fig. 1.

Referring more specifically to the drawings in which like characters of reference indicate like parts in the several views, the numeral 1 designates the axle of a vehicle upon which the wheel is mounted. The wheel organization comprises a central hub proper 2 of solid construction formed with an annular cut-away portion 3 which is adapted to receive an annular removable pneumatic casing clenching and retaining ring 4.

The circumferential faces of the hub proper and the ring when the latter is in place serve to form and provide a circumferential casing groove 5, and each has corresponding and registering transverse casing retaining or keying recesses or slots 6. The opposed spaced faces 7 and 8 of the hub and ring, respectively, serve to secure the clencher portions 9 of the casing which is designated as 10 and is adapted to inclose the usual pneumatic inner tube 11.

A pair of similar annular plates 12 and 13 are adapted to be secured to the hub proper 2 by means of a plurality of transverse bolts 14 which are inserted through the former, the hub, and the annular shoe or casing retaining ring 4 and serve to clamp the plates in opposed relation to either side of the hub and at the same time to lock the ring 4 in position.

Composite members 15 and 16 which may be of cast or pressed metal, include the extended radial spoke bearing sections 17 provided with flanged ends 17', the sections fitting together to form the complete cylindrical bearings and spoke housings. These composite members are adapted to be clamped together at a plurality of spaced points by bolts 18. Said members also include the radially inwardly extending flanged webbings 15' and 16' whose outer faces are adapted to slidably engage the opposed inner faces of the guide plates 12 and 13.

Radial spokes 19 having movement limiting collars 19' are slidably mounted in the spoke inclosing bearings 17 and carry at their hub or inner ends the integral tube or casing engaging shoes 20 which latter have their engaging faces slotted as at 20', and at their outer or tread ends the tread sections or feet 21 each provided with a tire section 22 and formed with the chamfered portions 23. The slots 6 in the hub and ring 4, and the slots 20' of said shoes are adapted to receive the projections or lugs 10' on the inner and outer portions or faces of the casing 10 and serve to retain the hub and spokes in locked relation to prevent relative circumferential movement thereof.

In my modified construction, Fig. 3, I prefer to mount the tread sections or feet 21 pivotally upon the spokes as at 24 and also to pivotally connect the adjoining ends thereof by means of the hinge couplings indicated at 25 and shown in detail in Fig. 5, the coupling comprising a tongue 26, a bifurcated bearing portion 27 and a pin 28.

In actual use the functions and actions of the various correlated elements described are substantially as follows:—Under an average load and normal smooth road conditions it is intended that each spoke tread section shall bear the load independently as the wheel rotates, transmitting the pressure directly to the cushioning member through the slidable spoke and the casing engaging shoe. When a heavier load is encountered however, and in order to distribute such load over a greater area of the casing the collar 19' of a given spoke will engage with the flanged outer end of the spoke inclosing bearing which will result in pressure being exerted on the latter and consequently the flanged webbings 15' and 16' of the composite members 15 and 16 will be slidably depressed between the guide plates 12 and 13, and hence a number of the casing engaging shoes will be brought into play.

The webbings 15' and 16' also provide positive means for preventing rupture of the cushioning casing and tube by excessive loads, for when the maximum pressure has been exerted upon the casing the limit of movement will be reached as the inner peripheries of said webbings will then be positioned to engage with the hub 2 to ride thereon and thus eliminate further resiliency and pressure upon the casing.

In taking out the pneumatic tube for repair or replacement the outer guide plate 12 and the clencher ring 4 are removed after first unscrewing the nuts on the bolts 14. The tire can then be easily withdrawn through the opening left by the removal of the ring, as will be clearly evident in the view, Fig. 4.

It is believed that the advantages and utility of my invention will be clearly understood from the foregoing description and, while I have set forth only one embodiment and a slight modification thereof, I hereby expressly reserve the right to make various changes in detail and general construction as good practice may dictate, and yet remain within the spirit and scope of my invention as defined in the appended claims.

Having described my invention, I claim:—

1. A wheel of the character described comprising a hub, an encircling cushioning means mounted thereon, annular guide plates secured to either side of said hub, annular composite members mounted between said plates, spoke inclosing bearings carried by said members, radial spokes slidably mounted in said bearings said spokes being provided with longitudinal movement limiting means adapted to engage the outer ends of said bearings, tread members carried at the outer ends of said spokes, cushion engaging shoes carried at the inner ends of said spokes, and shoe engaging portions carried by said composite members.

2. A wheel of the character described comprising a hub, an encircling cushioning means mounted thereon, annular guide plates secured to either side of said hub, annular composite members mounted between said plates, spoke inclosing bearings carried by said composite members, radial spokes slidably mounted in said bearings said spokes being provided with longitudinal movement limiting means adapted to engage said bearings, tread members carried at the outer ends of said spokes, cushion engaging shoes carried at the inner ends of said spokes, shoe engaging portions carried by said composite members, and radially inwardly extended webbings or flanges integral with said composite members adapted to engage and ride upon the hub under excessive loads.

3. A wheel of the character described comprising a hub, an encircling pneumatic tube casing mounted thereon, annular guide plates secured to either side of said hub, annular composite members slidably mounted between said plates, spoke inclosing sections carried by and formed integral with said composite members and adapted to be secured together and form tubular spoke inclosing bearings, radial spokes slidably mounted in said bearings, longitudinal movement limiting collars carried by said spokes adapted to engage the outer ends of said bearings, tread members carried at the outer ends of said spokes, casing engaging shoes carried at the inner ends of said spokes, a shoe engaging portion formed integral with said composite members, and radially inwardly extended webbings integral with said composite members adapted to engage and ride upon the hub when excessive pressure is exerted upon said casing.

In testimony whereof I affix my signature.

JOHN B. WILSON.

Copies of this patent may be obtained for five cents each, by addressing the "Commissioner of Patents, Washington, D. C."